Dec. 25, 1928.
J. E. CHRISTEN
SHOCK ABSORBER
Filed July 10, 1928
1,696,429
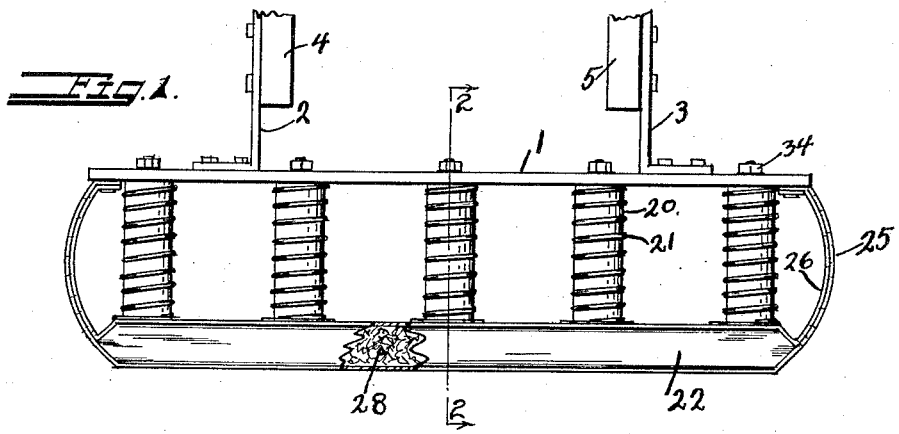
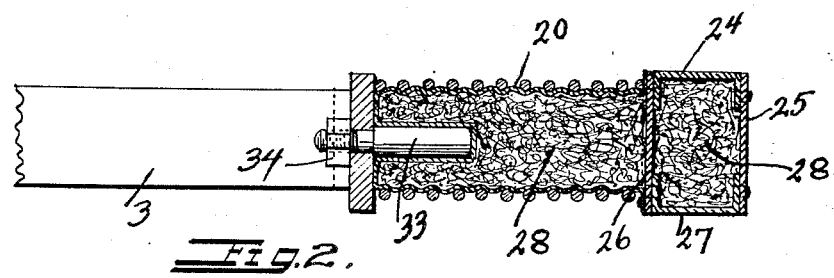
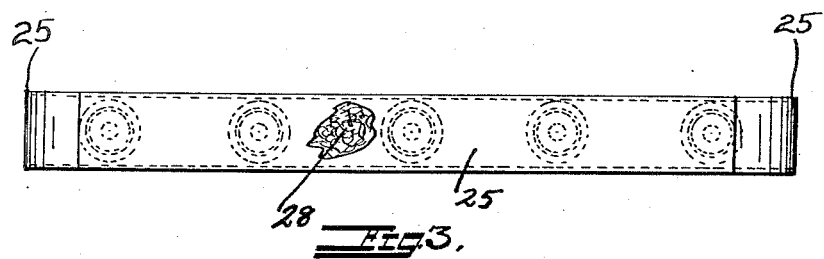
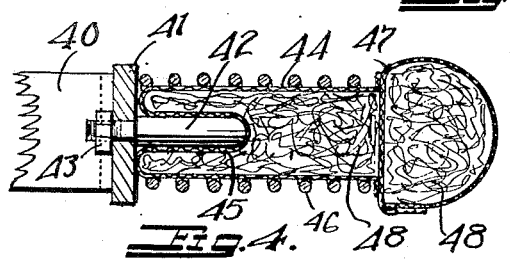
Inventor
John E. Christen
By Carlos P. Griffin
Attorney Patented Dec. 25, 1928.

1,696,429

UNITED STATES PATENT OFFICE.

JOHN EBERHARD CHRISTEN, OF SAN RAFAEL, CALIFORNIA.

SHOCK ABSORBER.

Application filed July 10, 1928. Serial No. 291,582.

This invention relates to a bumper for vehicles or vessels, and its object is to produce a bumper which is capable of absorbing heavy shocks without great injury thereto, and without injuring the movable body to which the bumper is secured.

It will be understood by those skilled in the art that it is necessary to provide both land vehicles and vessels with some kind of a bumper to avoid injuring the structure of the vehicles or vessels when accidentally or intentionally run against solid, or other heavy objects.

An object of the present invention is to provide a bumper which can be used equally well on road vehicles or when disassembled from the arms holding it to an automobile, it can be bolted to the front or back of a vessel to reduce the shocks on the frame of the vessel when struck against a wharf, or another ship.

The bumper as ordinarily used for automobiles, is about five feet in length and has a series of resiliently filled cushions from three to five inches in diameter, each about a foot long, and each of these cushions is in turn surrounded by a stiff spiral spring, both the spring and the cushions affording means to prevent one portion of the bumper from coming into contact with the other portion of the bumper.

Another object of the invention is to provide a bumper with a proper protecting device so as not to mar other vehicles with which the bumper may come in contact.

The compressible members of the bumper may be made of leather, rubber or other heavy fabric.

Other objects of the invention will be apparent as the description proceeds.

An embodiment of the invention is shown in the accompanying drawing in which the same reference numeral is applied to the same portion throughout the several figures of the drawings, and of which there may be modifications.

Figure 1 is a plan view of the complete bumper with a portion thereof broken away to show the steel wool inside the bumper front rod, Figure 2 is a transverse sectional view of the bumper through one of the forwardly extending tubular members, Figure 3 is a side elevation of the bumper showing a portion cut therefrom to indicate the interior construction, Figure 4 is a sectional view on the same line as Figure 2, except that a canvas fabric is used in the place of the stiff leather, or rubber fabric used on the front bar shown in Figure 1.

The main bar of the bumper is indicated at 1, and consists of a suitable heavy flat steel spring plate, usually made of spring steel, which is fastened to the bars 2 and 3 which bars extend to the side rail construction of the automobile as indicated at 4 and 5.

The bar 1 has a plurality of holes. There are shanks or studs 33, and nuts 34 holding said studs in place on the bar 1. There are five of the studs 33, and five of the cushions 20, said cushions 20 being cylindrical in shape and having a steel spiral spring 21 around each of them.

The cushions 20 and front cross piece 22 are suitably secured to the outer ends of the cylinders 20 across the entire width of the front bar 22.

The front bar 22 consists of four pieces 24, 25, 26 and 27. The pieces 24 and 27 being sewed at their edges to the edges of the pieces 25 and 26. The bar formed by the pieces 24, 25, 26 and 27 is flattened at the ends so that the pieces 25 and 26 can be brought around and attached to the end of the bar 1 to prevent the dislodgment of the bar 22 and associated parts.

The parts making up the bumper 20 and bumper 22 consist of leather or heavy rubber fabric, and as will be noted from Figure 2, the front end of these bumper members is so cut that it will form an internal finger by pressing thereon slightly with the result that the bumper members 22 can be placed in position and held in that position by fastening the straps 25 and 26 at each end of the bumper 1.

In operation this bumper has its resilient members 20 and 22 filled with steel wool 28, the object being to make the bumper members 20 as resilient as possible, while giving them the necessary stiffness and rigidity to withstand ordinary shocks.

In Figure 4 there is shown a slightly modified form of the front bar bumper in which 40 indicates the bar for securing the bumper to the automobile, and 41 the back bar carrying the studs 42, which studs are secured thereto by means of the nuts 43.

The resilient members are made up of a series of canvas cylinders 44, each cylinder being inturned at one end to form a socket to receive the pin 42 as indicated at 45. The cylinder is also covered with a spiral spring 46 the same as in the previous form of the invention, and the outer end of the cylinder is secured to a heavy canvas strip 47, which when filled with the steel wool 48 assumes a more or less cylindrical appearance in cross section.

Having thus described my invention, what I desire to secure by Letters Patent of the United States is as follows but modifications may be made in carrying out the invention as shown in the drawing and in the above particularly described form thereof, within the purview of the annexed claims.

1. A bumper, a solid bar adapted to be secured to a movable vehicle or vessel, a plurality of studs extending therefrom, a plurality of cushion members one for each stud, and a cushion member connecting all of the first cushion members for preventing injury to the vehicle or vessel.

2. A vehicle bumper of the class described comprising a flat bar carrying a plurality of forwardly projecting studs, a plurality of cylindrical cushions slidable over said studs, springs surrounding said cushions, and another cushion connected to the first cushions and to the ends of the flat bar.

3. A vehicle bumper of the class described comprising a flat bar, means to secure the same to a vehicle, a plurality of forwardly projecting studs carried by the bar, a plurality of cylindrical cushions slidable on said studs, a spring surrounding each cushion, another cushion connected to the outer ends of all of the first cushions, and straps extending therefrom to the ends of the flat bar.

4. A vehicle bumper of the class described comprising a flat bar, means to secure the bar to a vehicle, a plurality of forwardly projecting studs carried by said flat bar, a plurality of cylindrical cushions filled with steel wool slidable on said studs, resilient means surrounding the cushions adapted to hold them extended, a transversely extending steel wool filled cushion connected to the first cushions at their outer ends, and straps connecting said latter cushion to the ends of the flat bar to hold the entire structure in place.

5. A vehicle bumper of the class described comprising a flat bar, means to secure the same to a vehicle, a plurality of spiral springs bearing upon said bar, a padded front bar upon which the springs bear, and straps connecting the padded front bar with the flat bar.

In testimony whereof I have hereunto set my hand this 29th day of June, A. D. 1928.

JOHN EBERHARD CHRISTEN.